UNITED STATES PATENT OFFICE.

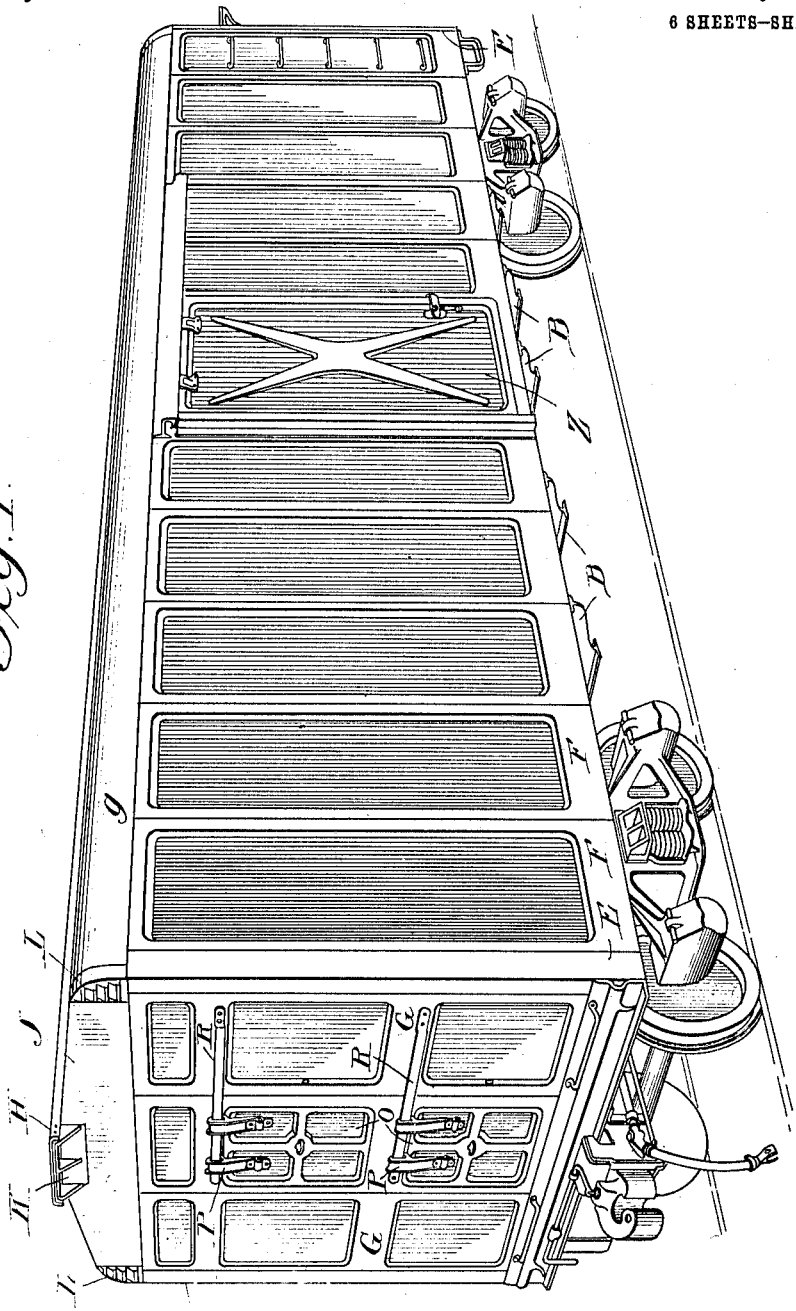

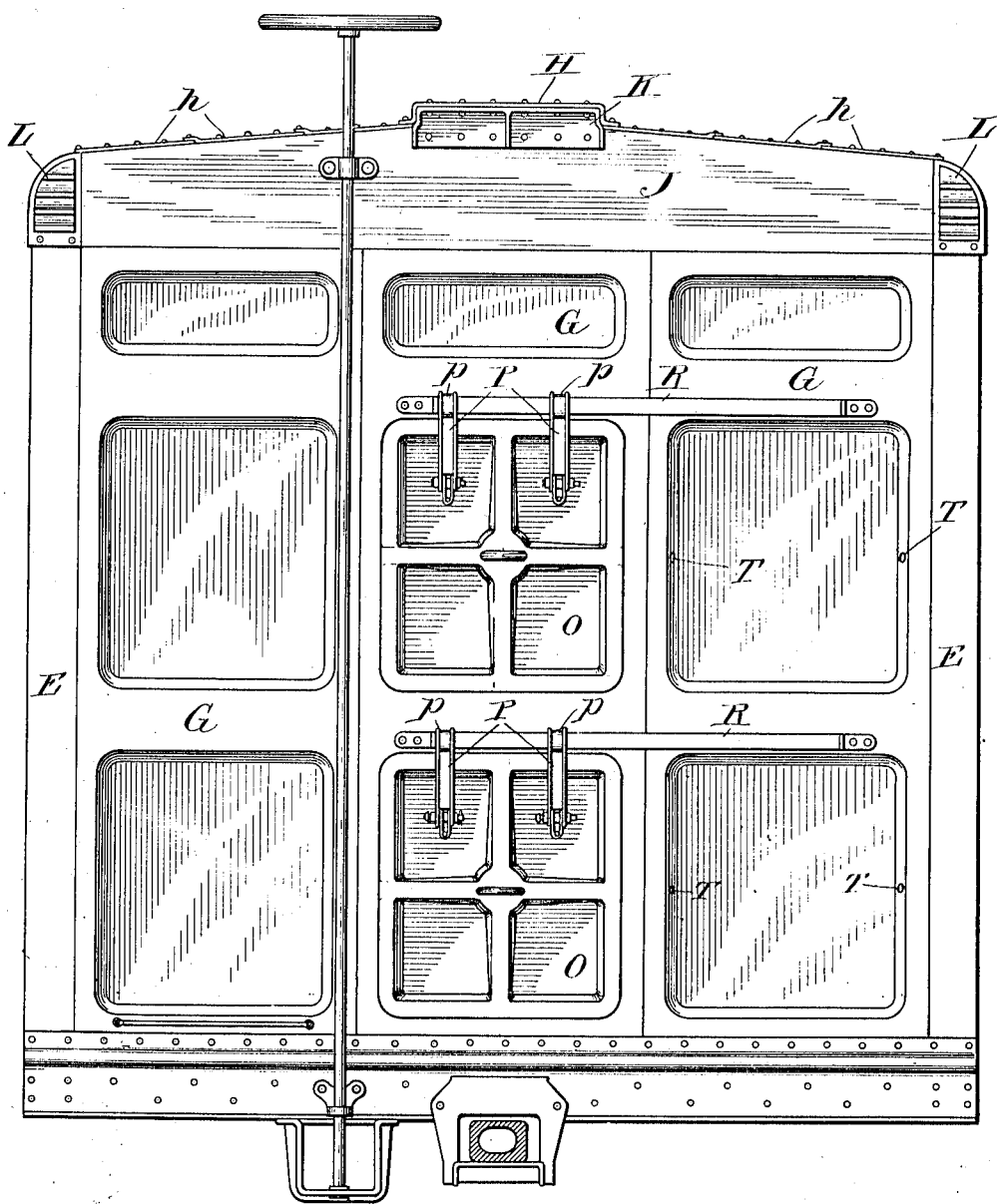

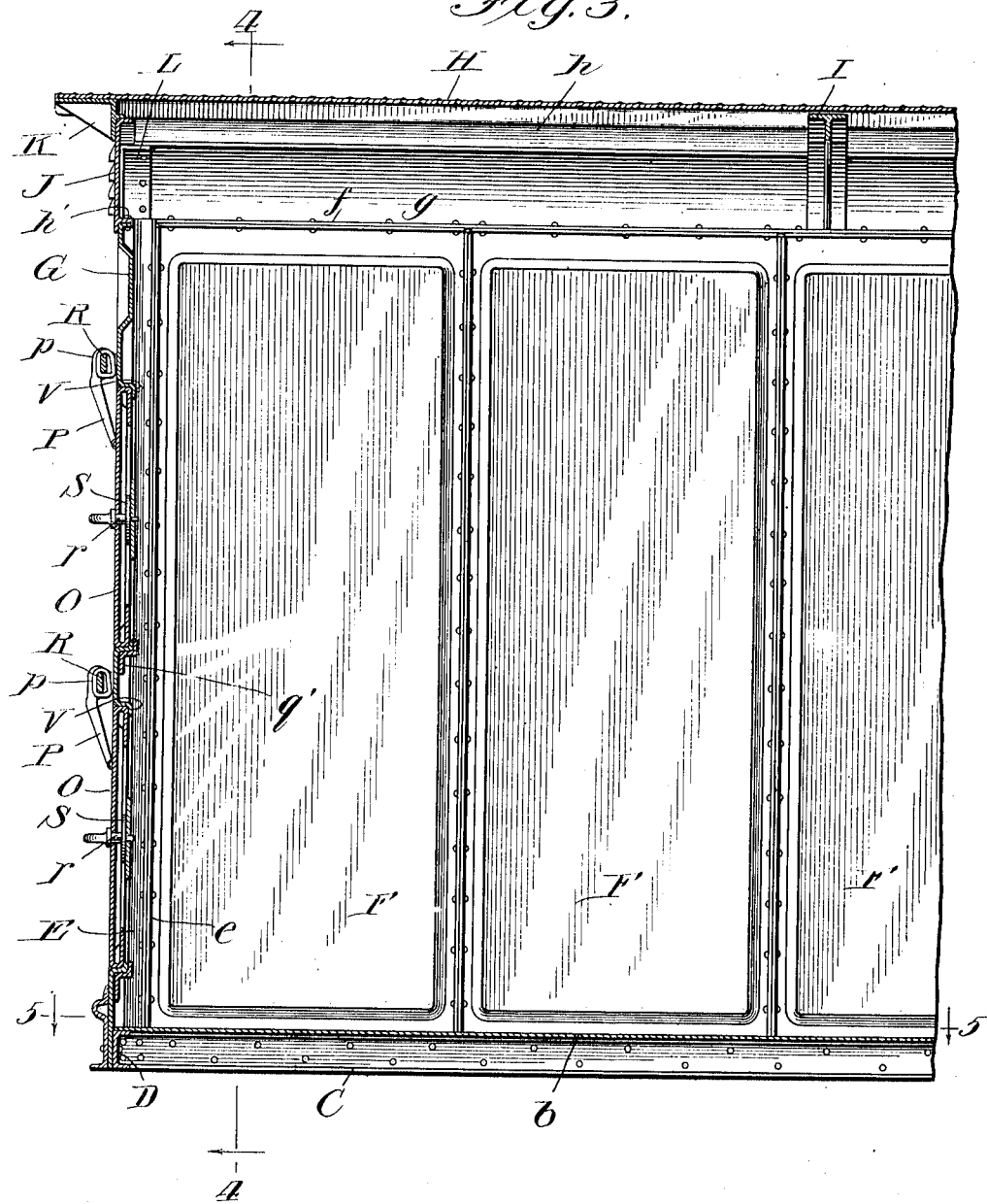

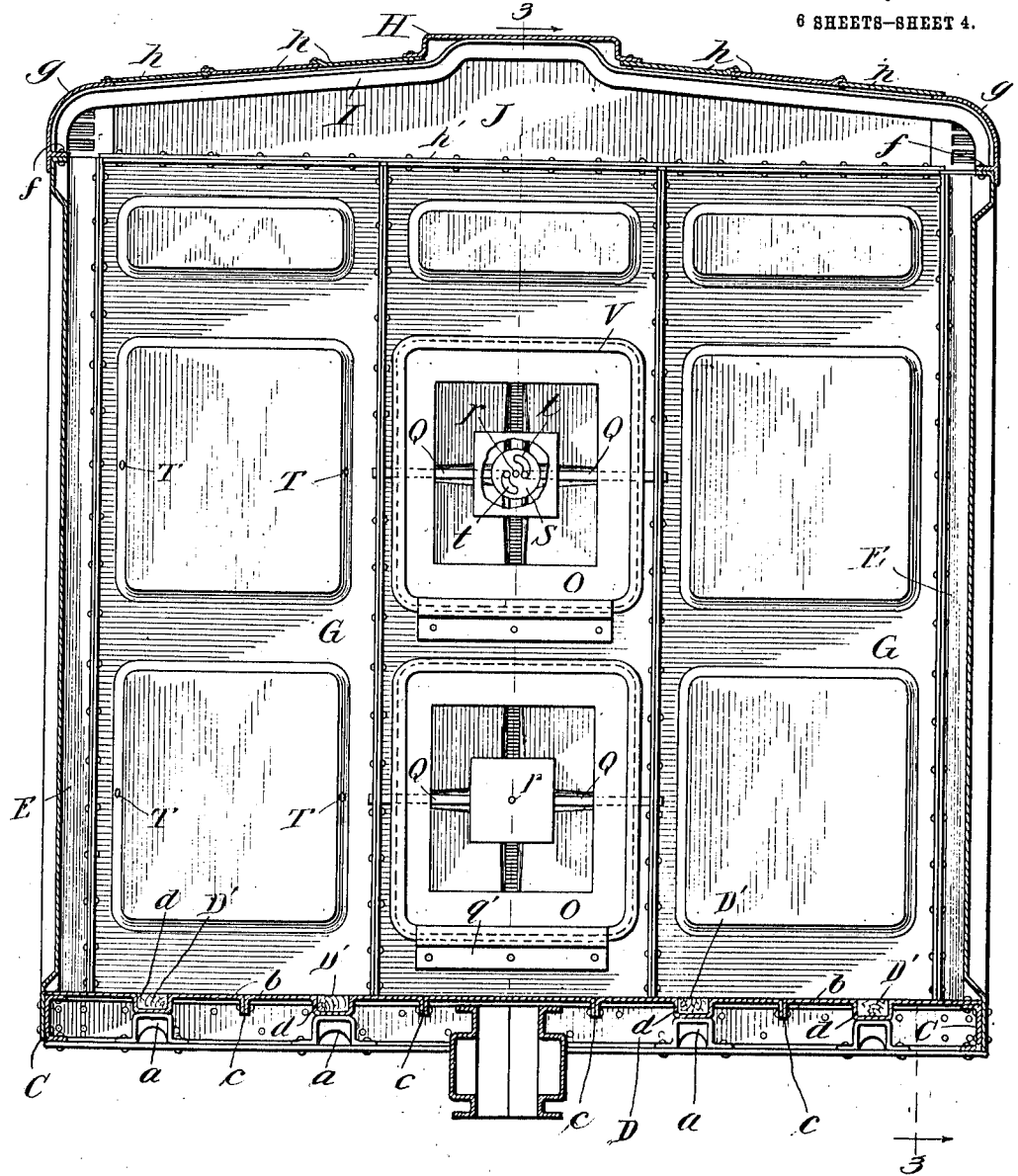

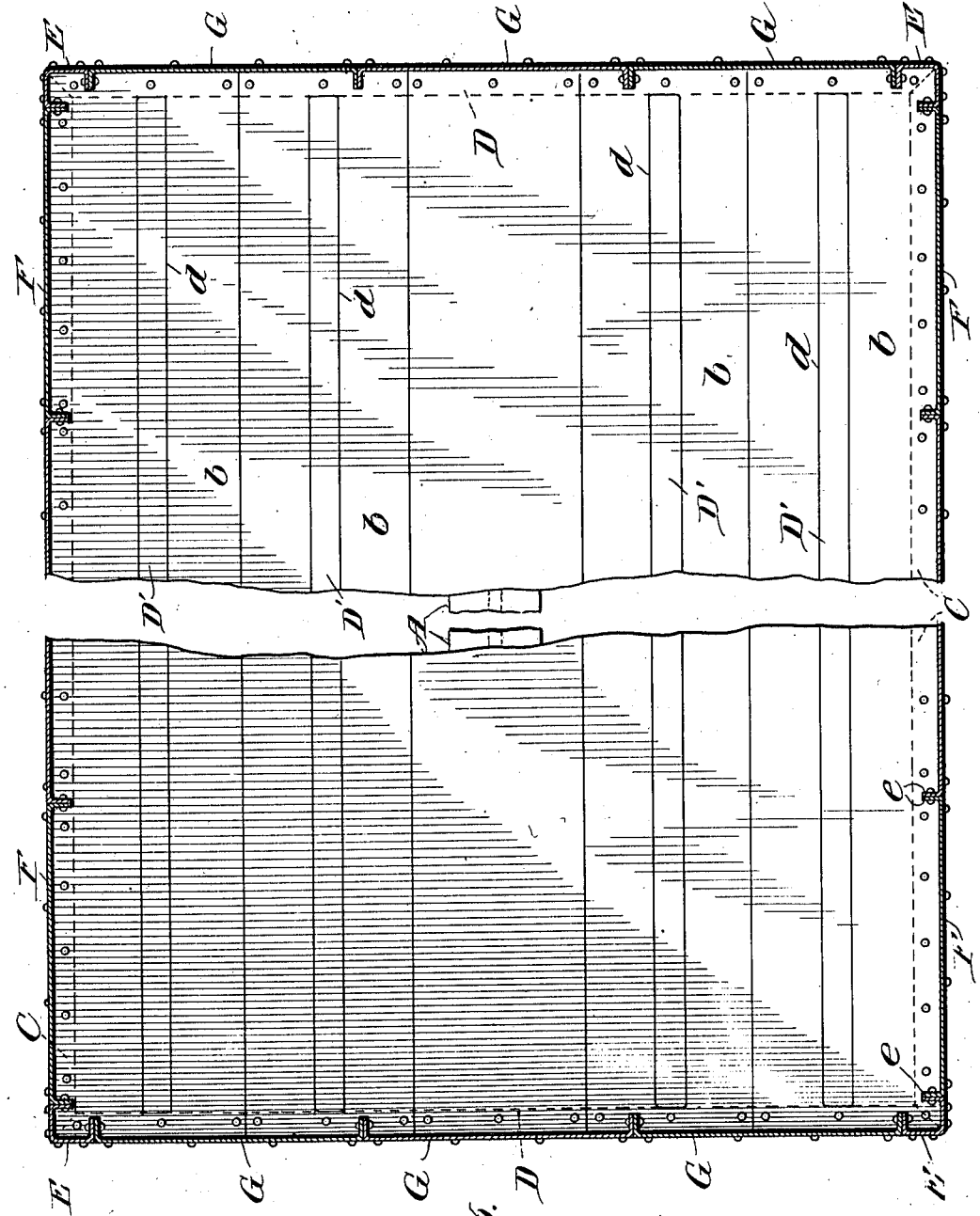

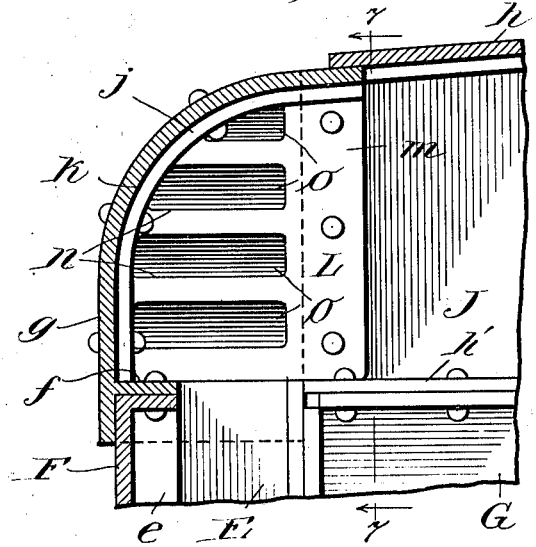
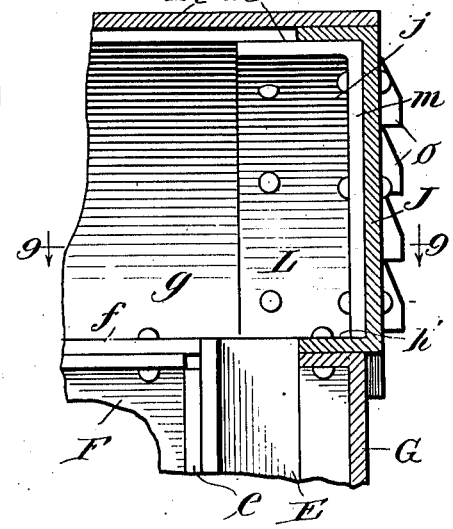
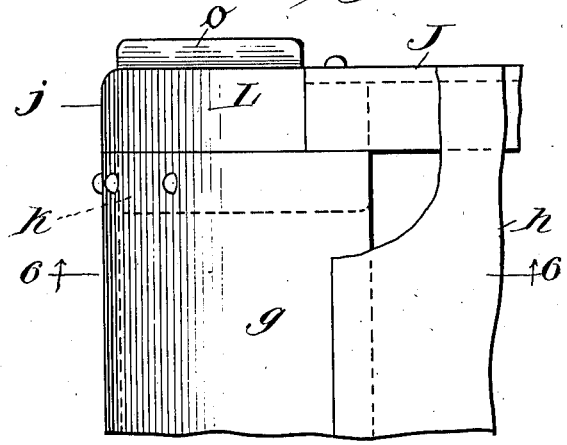
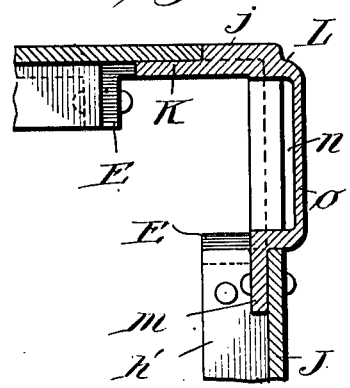

WILLIAM P. BETTENDORF, OF DAVENPORT, IOWA; J. W. BETTENDORF ADMINISTRATOR OF SAID WILLIAM P. BETTENDORF, DECEASED.

METAL-BOX-CAR CONSTRUCTION.

1,031,232.     Specification of Letters Patent.     Patented July 2, 1912.

Application filed December 17, 1909. Serial No. 533,605.

*To all whom it may concern:*

Be it known that I, WILLIAM P. BETTENDORF, a citizen of the United States, residing at Davenport, in the county of Scott and State of Iowa, have invented new and useful Improvements in Metal-Box-Car Construction, of which the following is a full, clear, and exact description.

My invention relates to freight cars and particularly to the kind known as box-cars that are constructed principally of metal.

The object of my invention is to provide a car the sides of which are made of sheet metal panels, so shaped that the necessity for skeleton frame-work, except at the four corners, is obviated; and otherwise to construct the cars so as to permit of the ventilation thereof and provide convenient access thereto, and so as to insure a strong, durable and economically made freight car. This I accomplish by the means hereinafter fully described, and as particularly pointed out in the claims.

In the drawings:—Figure 1 is a perspective view of a railroad car embodying my invention. Fig. 2 is an end elevation of the body of the same drawn to a larger scale. Fig. 3 is a central longitudinal vertical section of one end of the same taken on line 3, Fig. 4. Fig. 4 is a transverse vertical section thereof, taken on dotted line 4, 4, Fig. 3. Fig. 5 is a horizontal section of the said car taken on dotted line 5, 5, Fig. 3 the central portion thereof broken away. Fig. 6 is a vertical transverse fragmentary section of the corner ventilating casting taken on line 6—6 Fig. 8, and drawn to an enlarged scale. Fig. 7 is a vertical section thereof taken on line 7—7, Fig. 6. Fig. 8 is a top plan view thereof. Fig. 9 is a horizontal section of the same, taken on line 9—9, Fig. 7.

In the drawings A represents a single I-beam center-sill; B the needle-beams; C the channel beam side-sills, and D the end-sills of the underframe of my improved car. Further explanation of the underframe and floor of my improved car is unnecessary herein as the same forms the subject-matter of Letters Patent of the United States, No. 986,422, dated March 7, 1911, for flooring for freight cars.

The skeleton for the body of the car, with the exception of the corners thereof, is entirely dispensed with, as will hereinafter more fully appear, and at the corners the only frame-work consists of upright channel-beams, E, of suitable dimensions, each of which is stripped of its flanges below the plane of the floor, and then the web of the channel, is, midway between its flanges, bent transversely into an angle strip. The portion of the web extending below the floor is riveted or otherwise secured to the outer portions of the channel-beam side-sills and the end-sills adjacent to the corner. These corner uprights E extend as high as the eaves-plates of the roof of the car, and their flanges above the floor project inward at right angles to each other and provide surfaces to which the inwardly flanged vertical edges $e$ of the panels F, forming the sides and ends of the car are riveted or otherwise suitably secured. This construction of the uprights E practically makes them tubular, with the exception of the space between the edges of their flanges, which enables the metal workers to insert their hands or tools within the space inclosed thereby to facilitate the riveting of the vertical flanged edges of the panels to the flanges thereof.

The vertical flanges of the panels of the sides of the car-body and of the ends, G, thereof, when fastened together, take the place of the usual upright members or studding of the ordinary frame-work of the wooden box-car, and they are further strengthened by depressing the central area of the same so as to make a one-panel sideplate, F, or a three-panel end-plate, as G. Below the floor the vertical flanges of these side and end-plates are removed and the plates are riveted directly to the outer side of the web of the channel-beams constituting the side-sills and end-sills of the underframe and the upper edges of these side and end-plates are flanged inward and secured, by riveting or otherwise, to the horizontal flange, $f$, projecting inward from the lower portion of the longitudinal eaves-plates $g$ of the roof. These eaves-plates are, preferably, made of rolled metal beams, and have the lower edges of the webs thereof extending past flange, $f$, and lapping down past and outside of the upper flanged edges of the plates F. The upper portions of these eaves-plates are curved inward toward each other, and their upper edges are overlapped by the longitudinally extending roof-plates $h$. There may be several of these roof-plates $h$ between the eave-plates and the running-board H of the roof, and each are constructed with their lower edges off-set to lap over the higher plain edge of the plate below it. The running-board consists of a longitudinally extending sheet metal plate which constitutes the central portion of the roof and is about twice the width of the eave-plates, and this running-board is of an inverted channel shape, with the longitudinal edges thereof flanged laterally outward, and overlapping and secured to the contiguous longitudinal edge of the roof plates nearest to it. If desired the upper surface of this running-board may be roughened by punching the same upward to a slight extent from underneath, substantially as shown in Fig. 3, or may be roughened in any other desired manner.

At regular intervals along the length of the car, the eave-plates, the roof-plates and the running-board are supported by and secured to carlines, I, which latter consist of T-beams whose ends terminates at and rest upon the flanges $f$ of the eave-plates. These carlines are, preferably, continuous from end to end and bridge over from side to side of the car, and are inclined upward from their curved end portions to conform to the pitch of the roof, and at their centers of length are bent upward so as to come under and support the running-board, substantially as shown in Fig. 4 of drawings.

The upper edges of the end-plates, G, terminate in the same plane as the upper edges of the side-plates, F, of the car-body, and are flanged inward and the end of the car above the plane of these plates, G, and between the same and the roof is closed by a plate, J, the lower horizontal edge of which is, preferably, straight and overlaps the upper edges of said end-plates G. Near its lower edge, plate J has an inwardly projecting flange $h'$ that is riveted to the upper flanges of the end-plates, and the upper edge of said plate J is inclined upward from each end to conform to the pitch of the roof, and is likewise flanged inward to afford a support for the ends of the roof-plates, and furnish the means for connecting the same, by rivets or otherwise to the ends of the car. I prefer, as shown in the drawings, to extend the ends of the running-board beyond the ends of the car, and to support its overhanging ends by means of brackets K, which latter are adapted to act as fillers to close the openings between the central portion of the upper edges of plate J and the underside of the running-board.

The ends of the plate, J, above the vertical plane of the adjacent edge of the uprights E, and the ends of the eave-plates, terminate a little short of the sides of the car, and the space thus left is occupied by corner-plates L, which are, preferably, made of cast metal. The body of each of these corner-plates consists of a flat vertical portion the outer surface of which is slightly outside of the vertical plane of the end of the car, and this vertical body portion has its upper and outer vertical side edges $j$, flanged to conform to the curvature of the adjacent ends of the eave-plates, and then depressed so as to form a depressed edge $k$, over which the end portions of said eave-plates lap and are riveted or otherwise secured. The lower edge of the lowermost roof-plate overlaps the upper edge of the flanged portion $k$ of corner-plate L, and the adjacent vertical end edge of the end-plate J, overlaps and is riveted or otherwise secured to the adjacent vertical flanged edge $m$ of the corner-plate, substantially as shown in the drawings. The flat vertical body portion of the corner-castings L, are provided with transverse openings $n$, $n$, therein, and the outer sides of these openings, are protected by overhanging integral lips $o$ that prevent the cinders and rain from passing through them.

I prefer to make each of the end-plates of the car with three panels, and to provide the central plates thereof with an upper and a lower door opening. The lower two of these panels (which are made by depressing the metal) are, preferably, about square and nearly as wide as the plate. The door-openings just mentioned are made by removing the sunken parts of the two lower panels, each of which is about square, with the exception of a narrow marginal portion, V, thus forming a frame for the door-openings, the lower horizontal portions of which are reinforced by the Z-plates $q'$. The doors, O, for closing these openings, are made of rectangular sheet metal plates corresponding to the area of the panels, and are pivotally hung to the lower ends of suitable hangers P, the upper ends of which latter are provided with bosses $p$ having transverse trapezoidal openings therein through which the transverse horizontal track R passes. These tracks extend toward the side of the car at the right of the openings, and have their ends bent toward and secured to the end of the car, to hold the portion thereof on which the hangers slide, out from the car a suitable distance.

Each door is, preferably, made with four sunken panels, and each has its edges bent backward parallel to its front so as to strengthen the same. Each is locked in place by means of a central spindle $r$, that extends out through an opening in the center of the door and has a suitable handle formed on its outer end. On the inner side of the door this spindle is provided with a disk S, that is seated and is adapted to be rotated in the depression in its inner surface made by the confluence of the channels resulting from paneling the door. This disk has oppositely located eccentric segmental grooves $t$, in it, which are engaged by pins or studs projecting into the same from the adjacent ends of horizontal bolts $Q$, $Q$, which latter extend on each side of the disk beyond the edges of the door, and move in horizontal channels on the inside of the same. When the spindle of the door-lock is turned to a horizontal position, the outer ends of the bolts are shot through openings in the edges of the door and into holes in the side-frames of the door-opening, and when said handle is turned into a vertical position, these bolts are withdrawn from the holes in the side-frame of the door-opening and the door is then free to be swung outward to clear the opening, and free to be slid sidewise in front of the correspondingly closed panel in the side end-plate of the car, whereupon it is pushed back into the closed panel, and the said handle turned into its horizontal position again and the bolts shot into holes T in the sides of closed panel, and thus lock the door in its open position.

When constructed in the manner hereinbefore described my improved car is strong and durable in construction, and permits perfect ventilation therethrough, particularly near the roof of the same, so that the heated air resulting from the exposure of the car to the sun, especially during the warm weather will, when the car is in motion be removed. The construction of the floor is such that it greatly strengthens the underframe of the car; is more durable than wooden floors, and also provides an opportunity for the anchoring of freight through the medium of the nailing strips D. The door openings in the ends of the car facilitate both the ventilation of the car, and, when it is used for cold storage, conveniently permits of access to its interior for icing.

I have not described herein the construction and operation of the side-door Z and its coacting parts, as the same constitutes the subject-matter of a separate application for Letters Patent of the United States filed by me, November 3rd, 1909, Serial No. 526,095 (Case 160).

What I claim as new is:—

1. A box-car, the ends of which comprise end-sills, vertical sheet metal plates and transversely extending top-plates, said vertical plates having their lower portions lapping outside of and secured to said sills, having their vertical edges secured to the corresponding edges of the companion plates, and having their upper portions secured to the lower horizontal edge-portions of the top-plates.

2. A box-car, the ends of which comprise end-sills, vertical sheet metal plates having their upper edges flanged inward, and transversely extended top-plates having their lower horizontal edges flanged inward, said vertical plates having their lower portions lapping outside of and secured to said sills, having their vertical edges secured to the corresponding edges of the companion wall-plates, and having their upper flanges secured to the lower horizontal flanged edges of the top-plates.

3. A box-car comprising side-walls, and end-walls, said side-walls consisting of vertically arranged sheet metal plates the central portion of which is depressed to form a panel, and said end-walls consisting of similar plates depressed so as to form three panels, the depressed area of the central panel of one of which is cut away to form an opening into the car.

4. A box-car the ends of which comprise corner-posts consisting of angle-shaped metal beams, the upper ends of which terminate below the plane of the pitch of the roof, end-walls comprising vertically disposed plates whose upper edges terminate in the same plane as the upper ends of said posts, top-plates to the lower edges of which the upper edges of said end wall-plates are secured and which extends transversely in substantially the same vertical plane as the corner posts, a roof having metal eaves-plates and cast-metal corner castings to which the ends of said top-plates, the eaves-plates and the posts are connected.

5. A box-car the ends of which comprise corner posts consisting of angle-shaped metal beams, the upper ends of which terminate below the plane of the pitch of the roof, end-walls comprising vertically disposed plates whose upper edges terminate in the same plane as the upper ends of said posts, top-plates to the lower edges of which the upper edges of said end wall-plates are secured and which extends transversely in substantially the same vertical plane as the corner-posts, a roof having metal eaves-plates and cast-metal corner-castings to which the ends of said top-plates, the eaves-plates and the posts are connected, and which have ventilation opening therein.

In witness whereof I have hereunto set my hand this 10th day of December, 1909.

WILLIAM P. BETTENDORF.

Witnesses:
A. B. FRENIER,
W. G. RANSOM.